(12) United States Patent
Jiang et al.

(10) Patent No.: US 10,034,227 B1
(45) Date of Patent: Jul. 24, 2018

(54) ACCESS POINT ASSOCIATION USING TRIGGER-BASED UPLINK SINGLE USER TRANSMISSION

(71) Applicant: Marvell International Ltd., Hamilton (BM)

(72) Inventors: Jinjing Jiang, San Jose, CA (US); Liwen Chu, San Ramon, CA (US); Lei Wang, San Diego, CA (US); Yakun Sun, San Jose, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 24 days.

(21) Appl. No.: 15/374,066

(22) Filed: Dec. 9, 2016

Related U.S. Application Data

(60) Provisional application No. 62/266,185, filed on Dec. 11, 2015.

(51) Int. Cl.
| | |
|---|---|
| *H04L 1/00* | (2006.01) |
| *H04W 48/12* | (2009.01) |
| *H04W 72/04* | (2009.01) |
| *H04L 5/00* | (2006.01) |
| *H04W 84/12* | (2009.01) |
| *H04W 88/08* | (2009.01) |
| *H04W 72/12* | (2009.01) |

(52) U.S. Cl.
CPC .......... *H04W 48/12* (2013.01); *H04L 5/0055* (2013.01); *H04W 72/042* (2013.01); *H04W 72/0413* (2013.01); *H04W 72/1289* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 9,641,234 | B2 * | 5/2017 | Moon | .................. H04B 7/0621 |
| 9,832,792 | B2 * | 11/2017 | Ghosh | .............. H04W 74/0833 |
| 2011/0305176 | A1 | 12/2011 | Wentink | |
| 2013/0279405 | A1 | 10/2013 | Jafarian et al. | |

(Continued)

OTHER PUBLICATIONS

"First Action Interview Office Action", U.S. Appl. No. 15/374,844, dated May 31, 2018, 9 pages.

(Continued)

*Primary Examiner* — Jutai Kao

(57) ABSTRACT

In aspects of access point association using trigger-based uplink single user transmission, a wireless network system includes a station device that detects an initial trigger frame communicated in the wireless network system, and the station device can communicate an association request to an access point to join the wireless network system. The access point can receive the association request from the station device and generate an association response as an acknowledgement to the association request. The acknowledgement aggregates an association response frame that includes an association identifier for the station device and a unicast trigger frame to initiate a trigger-based uplink single user (UL-SU) transmission from the station device. The access point can then communicate the acknowledgement to the station device.

20 Claims, 5 Drawing Sheets

(56) References Cited

U.S. PATENT DOCUMENTS

| | | | |
|---|---|---|---|
| 2013/0329620 A1* | 12/2013 | Kim | H04W 52/0229 |
| | | | 370/311 |
| 2014/0211674 A1* | 7/2014 | Hiremath | H04W 52/0216 |
| | | | 370/311 |
| 2015/0063190 A1* | 3/2015 | Merlin | H04L 5/0037 |
| | | | 370/312 |
| 2015/0124690 A1 | 5/2015 | Merlin et al. | |
| 2016/0165589 A1* | 6/2016 | Chu | H04L 5/0007 |
| | | | 370/329 |
| 2016/0242177 A1 | 8/2016 | Seok | |

OTHER PUBLICATIONS

"Pre-Interview Communication", U.S. Appl. No. 15/374,844, dated Apr. 20, 2018, 9 pages.

* cited by examiner

ACCESS POINT ASSOCIATION USING TRIGGER-BASED UPLINK SINGLE USER TRANSMISSION

CROSS REFERENCE TO RELATED APPLICATION

This application claims priority under 35 U.S.C. § 119(e) to U.S. Provisional Patent Application Ser. No. 62/266,185 filed Dec. 11, 2015, the disclosure of which is incorporated by reference herein in its entirety.

BACKGROUND

Computing devices, such as mobile phones, tablet devices, laptop computers and any other communication-enabled devices wirelessly communicate with access points, such as implemented in a Wi-Fi network. A mobile computing device is commonly referred to as a client device or "station" in a Wi-Fi network. Generally, a station may be any portable, mobile, or fixed computing device designed to be IEEE (Institute of Electrical and Electronics Engineers) 802.11 (Wi-Fi) compliant with a media access control (MAC) and physical layer (PHY) interface for wireless communication. A station communicates with an access point that is within communication range in the Wi-Fi network.

Generally, an access point, such as may be implemented in a router device, provides network connectivity for a Wi-Fi compliant device, such as a fixed or mobile computing device. Additionally, access points typically have a greater communication range than do the stations, which may vary in power-level capabilities, some being high-end stations with more of a communication range and others being low-end stations with less of a communication range. However, all of the stations need to be able to associate and communicate with an access point to enable wireless communication on the Wi-Fi network.

Often, a station can receive a beacon and downlink packet from an access point in the network, but cannot associate and exchange data frames with the access point due to a limited communication range of the station. Due to the asymmetric uplink/downlink budget for packet exchange between an access point and a low-end station, an uplink single-user (UL-SU) packet from a station device may not reach the access point even though the station receives a downlink packet from the access point. For example, an access point may be designed to support uplink OFDMA (Orthogonal Frequency-Division Multiple Access) including random access uplink OFDMA, such as proposed in the new IEEE 802.11ax protocol.

With this digital modulation technique, multiple stations can communicate with an access point by assignment of subsets of subcarriers to individual ones of the stations, which provides for simultaneous low data rate transmission from several stations. If the access point supports uplink OFDMA and the station transmits an association request or other request frames through the uplink OFDMA via the resource unit designated for random access, a particular station may not yet have an association identifier (AID) to participate in downlink OFDMA and receive the corresponding response, even though the access point can use EDCA (Enhanced Distributed Channel Access) single-user (SU) to deliver such a response. Further, an acknowledgement (ACK) from the station may not reach the access point due to the low power and limited communication range of the station.

SUMMARY

This Summary introduces concepts of access point association using trigger-based uplink single user (UL-SU) transmission, and the concepts are further described below in the Detailed Description and shown in the Figures. Accordingly, this Summary should not be considered to describe essential features nor used to limit the scope of the claimed subject matter.

In an aspect of access point association using trigger-based uplink single user transmission, an access point is implemented for wireless communication, and includes a receiver component to receive an association request from a station device. A management entity of the access point can obtain an association identifier for the station device and generate an association response as an acknowledgement to the association request. The acknowledgement aggregates an association response frame that includes the association identifier and a unicast trigger frame to initiate a trigger-based uplink single user (UL-SU) transmission from the station device. The access point also includes a transmitter component to then communicate the acknowledgement to the station device.

A method implemented by an access point in a wireless communication network is described for access point association using trigger-based uplink single user transmission. The method includes receiving an association request from a station device, and obtaining an association identifier for the station device. The method also includes generating an association response as an acknowledgement to the association request, where the acknowledgement aggregates the association response frame that includes the association identifier and a unicast trigger frame to initiate a trigger-based uplink single user (UL-SU) transmission from the station device. The method further includes communicating the acknowledgement to the station device.

In another aspect of access point association using trigger-based uplink single user transmission, a wireless network system includes a station device that is implemented to detect an initial trigger frame communicated in the wireless network system, and communicate an association request through random access uplink OFDMA to join the wireless network system. The wireless network system also includes an access point that is implemented to receive the association request from the station device, and generate an association response as an acknowledgement to the association request. The acknowledgement aggregates the association response frame that includes an association identifier for the station device and a unicast trigger frame to initiate a trigger-based uplink single user (UL-SU) transmission from the station device. The access point is also implemented to then communicate the acknowledgement to the station device.

The details of one or more implementations are set forth in the accompanying drawings and the description below. Other features and advantages will be apparent from the description and drawings.

BRIEF DESCRIPTION OF THE DRAWINGS

Details of access point association using trigger-based uplink single user (UL-SU) transmission are described with reference to the following Figures. The same numbers may be used throughout to reference like features and components that are shown in the Figures.

DETAILED DESCRIPTION

Figure 1:
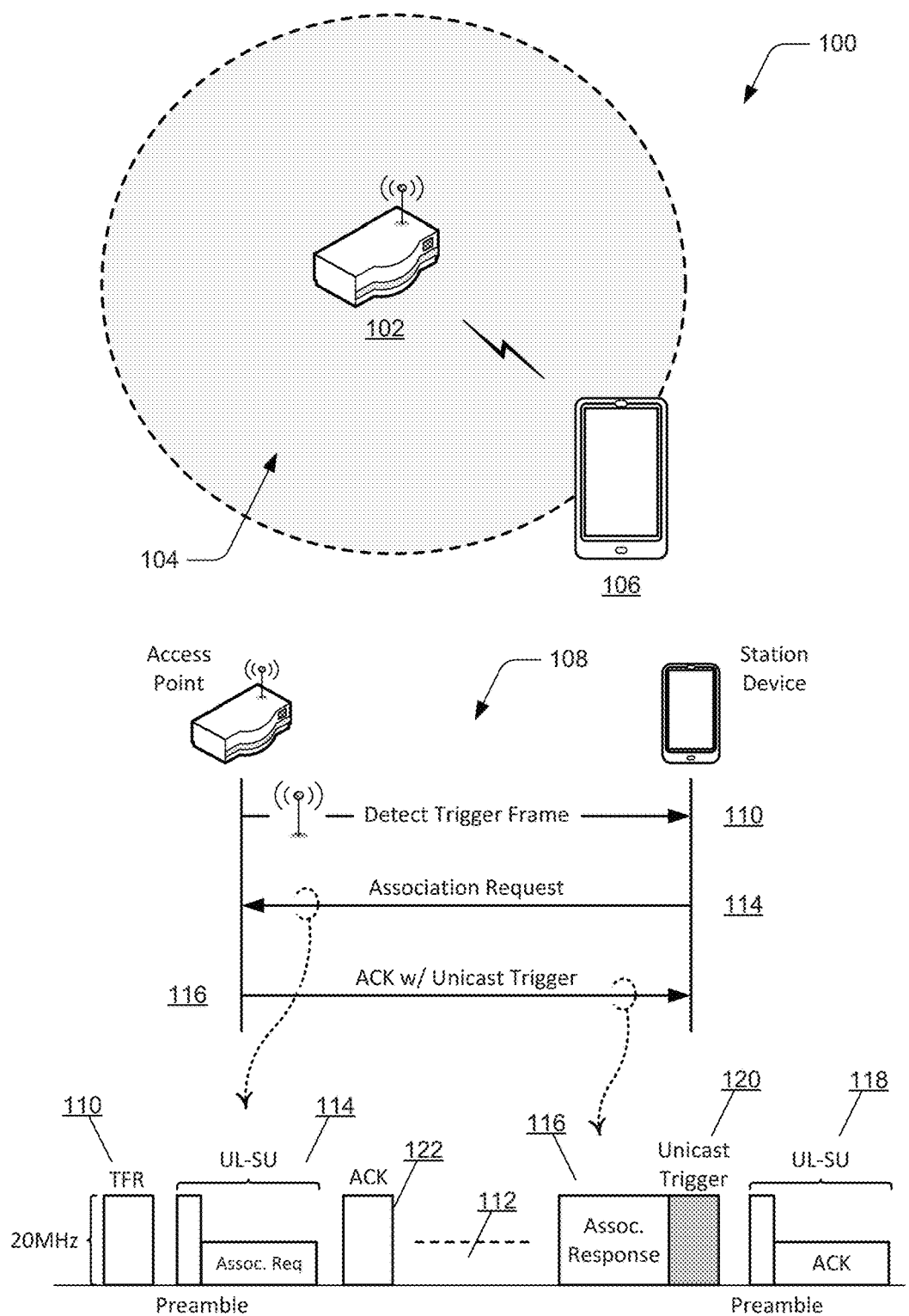
FIG. 1 illustrates an example system in which access point association using trigger-based uplink single user transmission can be implemented.

Techniques for access point association using trigger-based uplink single user (UL-SU) transmission provide a mechanism for station devices to associate and communicate with an access point using a trigger-based uplink single user (UL-SU) transmission. The techniques can be implemented for an access point and station devices that support triggered uplink OFDMA (Orthogonal Frequency-Division Multiple Access) including the random access uplink OFDMA, such as proposed in the new IEEE 802.11ax protocol for High Efficiency WLAN (Wireless Local Area Network) (HEW). The aspect of a triggered UL-SU transmission provides extended range for a station device to communicate with an access point, utilizing management frames to facilitate association and uplink data.

In implementations, a station device can detect an initial trigger frame communicated from an access point, and then communicates an association request back to the access point. The association request can be communicated by the station device in the uplink OFDMA mode to the access point. The access point receives the association request from the station device and obtains an association identifier (AID) for the station device from a management entity of the access point. The access point can then communicate an association response as a downlink single user (UL-SU) acknowledgement with a unicast trigger frame back to the station device. In this single user mode transaction, the unicast trigger frame with the association identifier provides that the station device can determine the resource unit that should be used to transmit the acknowledgement to the association response from the access point. There is no ambiguity as to which station device the acknowledgement is intended.

The addition of the unicast trigger frame aggregated with the association response provides for the station association using trigger-based uplink single user (UL-SU) transmission. The described technique can be implemented with the existing physical layer (PHY) implementation at both the access point and the station device, without the need to design or use a new control frame format in order to piggyback the unicast trigger frame in the association response. The provision for including a trigger frame is supported by the UL OFDMA mode, and is utilized for the described single user technique to complete an association request from a station device without altering the media access control (MAC) and physical layer (PHY) interface for IEEE 802.11 (Wi-Fi) compliance at either the access point or the station device. Additionally, as noted above, the triggered UL-SU transmission provides an extended communication range for the station device to communicate with the access point.

While features and concepts of access point association using trigger-based uplink single user transmission can be implemented in any number of different devices, systems, environments, and/or configurations, aspects of access point association using trigger-based uplink single user transmission are described in the context of the following example devices, systems, and methods.

FIG. 1 illustrates an example system 100 in which aspects of access point association using trigger-based uplink single user (UL-SU) transmission can be implemented. The example system 100 includes an access point 102, such as a router device implemented in a Wi-Fi network for wireless communications within a communication range 104 of the access point. A station device 106 can associate and wirelessly communicate with the access point 102 when located within the communication range 104 of the access point. A mobile phone, tablet device, or laptop computer are examples of computing devices that may be commonly referred to as a client device or "station" in a Wi-Fi network. Generally, the station device 106 may be any IEEE (Institute of Electrical and Electronics Engineers) 802.11 (Wi-Fi) compliant portable, mobile, or fixed computing device with a media access control (MAC) and physical layer (PHY) interface for wireless communication.

In this example system 100, both the access point 102 and the station device 106 are implemented to support triggered uplink OFDMA (Orthogonal Frequency-Division Multiple Access), such as proposed in the new IEEE 802.11ax protocol for High Efficiency WLAN (Wireless Local Area Network) (HEW). A communication sequence 108 is shown to illustrate the communications between the access point 102 and the station device 106 in implementations of access point association using trigger-based uplink single user transmission. Initially, the station device 106 can detect an initial trigger frame (TFR) 110 communicated from the access point 102 when the station device is located within or coming into the communication range 104 of the access point. In implementations, the initial trigger frame 110 can be communicated from the access point 102 as a 20 MHz downlink frame within the communication range 104 of the access point.

The station device 106 can detect and then randomly select a frequency portion 112 of the 20 MHz downlink frame by which to reply to the access point 102, such as a 2 MHz bandwidth of the downlink frame. This provides an extended communication range for a low-end station device that may have less power and a limited communication range. The station device 106 can transmit data to the access point 102 at the selected frequency, and with the extended communication range, the communication from the station device can reach the access point using the narrower bandwidth of the initial downlink frame.

The station device 106 receives the initial trigger frame for random access (TFR) 110 from the access point 102 and can then communicate an association request 114 back to the access point. The association request 114 is communicated in the uplink OFDMA mode to the access point 102 at the selected resource unit (e.g., in the selected portion of the 20 MHz frame). The access point 102 receives the association request 114 from the station device 106 and assigns an association identifier (AID) from a management entity of the access point. The access point can communicate an acknowledgement (ACK) frame 122 to the station device 106 to acknowledge the successful receipt of the association request from the station device 106. The ACK frame 122 is a low mac-layer-level acknowledgement to the association request frame, whose MAC address will be the station device's MAC address. The access point 102 can then communicate an association response 116 as a downlink single user (UL-SU) PPDU 118 aggregated with a unicast trigger frame 120 back to the station device 106. The association response 116 and unicast trigger frame 120 is the high-level acknowledgement to the association response configured as a DL-SU transmission. In this single user mode transaction, the unicast trigger frame 120 with the association identifier provides the station device 106 which resource unit the station device 106 should use to send back the ACK frame to the access point 102 for the association response.

The addition of the unicast trigger frame 120 in the association response 116 provides for the station device using trigger-based uplink single user (UL-SU) transmission. The described technique can be implemented with the existing physical layer (PHY) implementation at both the access point 102 and the station device 106, without the need to design or use a new control frame format. The provision for including a trigger frame is supported by the UL OFDMA mode, and is utilized for the described single user technique to complete an association request from a station device without altering the media access control (MAC) and physical layer (PHY) interface for IEEE 802.11 (Wi-Fi) compliance at either the access point 102 or the station device 106. Additionally, as noted above, the triggered UL-SU transmission provides an extended communication range for the station device 106 to communicate with the access point 102, utilizing the management frames to facilitate the association and uplink data. In this example, the management frames encompass the association request 114 and the acknowledgement frame 118.

As noted above, implementation of a new control frame format, such as an enhanced acknowledgement (E-ACK) or a multi-STA block acknowledgement (M-BA), is not needed to implement the techniques for access point association using trigger-based uplink single user transmission as described herein. Typically, both the access point 102 and a station device 106 that support uplink OFDMA need to adhere to the stringent requirements, such as for power control. However, without the described technique for triggered UL-SU transmission, there are issues with association using random access OFDMA and OFDMA enhanced acknowledgement (E-ACK). Similarly, there are issues with association using random access OFDMA and multi-STA block acknowledgement (M-BA).

For example, in a system using random access OFDMA and OFDMA enhanced acknowledgement (E-ACK), an access point can receive an association request from a station device and in response, communicate a downlink ACK/BA to the station device with a pre-AID 10 and the MAC address of the station device. The station device receives the downlink acknowledgement and incorrectly determines its own association identifier (AID) as 10 because the ACK/BA includes the station device's MAC address. To acknowledge an association request without the described technique for triggered UL-SU transmission, a new enhanced acknowledgement (E-ACK) frame would need to be implemented as a control frame format so that the pre-AID is bonded with a particular random access resource unit (RU).

Further, in a system using random access OFDMA and multi-STA block acknowledgement (M-BA), the station device can receive a downlink acknowledgement of an association request from an access point. However, the station device will not be able to determine that the acknowledgement is intended for the station device because of the multi-station acknowledgements that are broadcast in the wide-band frame for all of the station devices trying to associate with the access point. To acknowledge an association request without the described technique for triggered UL-SU transmission, a new M-BA frame format would need to be implemented at both the access point and at the station device, where the pre-AID is assigned by the lower MAC, rather than by the upper management entity of the access point.

Figure 2:
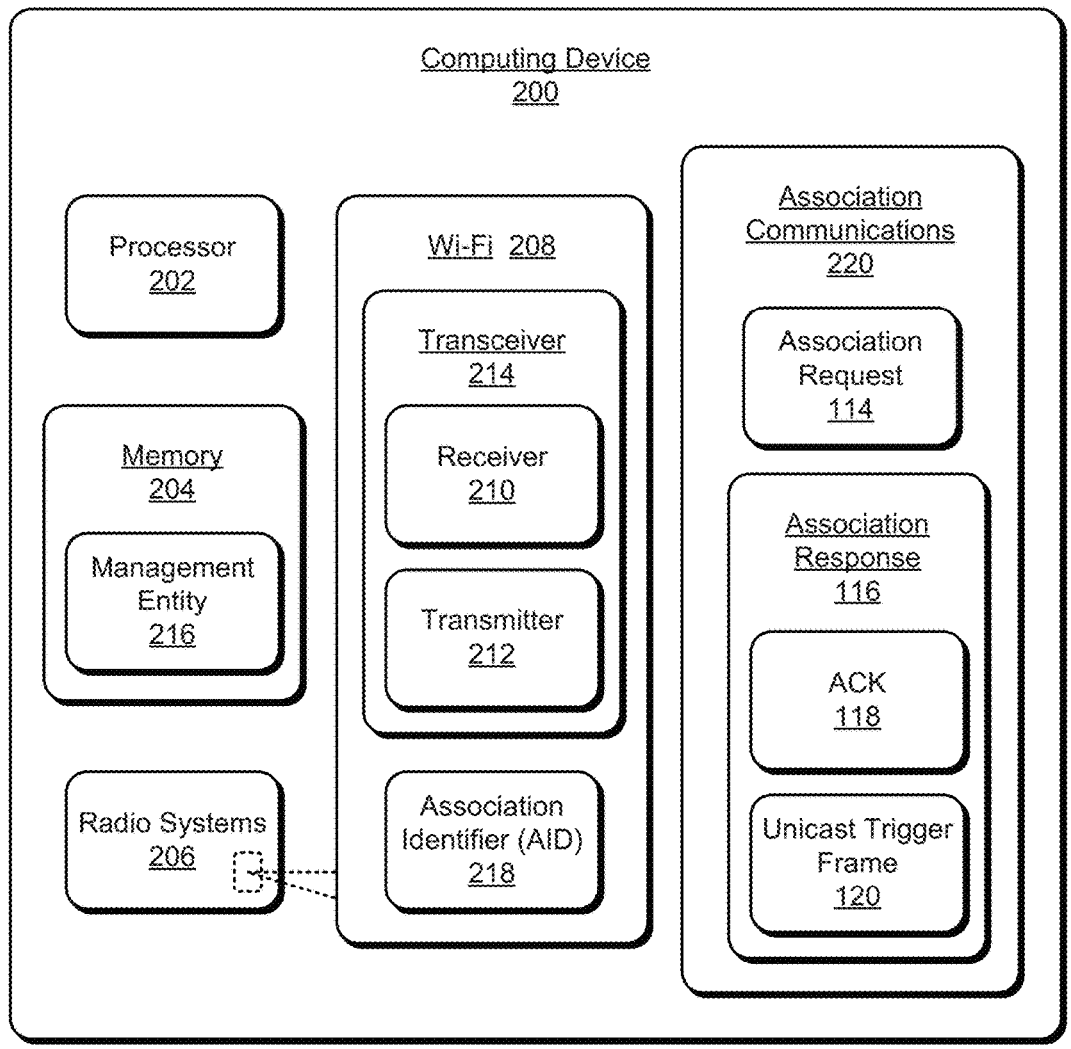
FIG. 2 illustrates an example computing device for aspects of access point association using trigger-based uplink single user transmission.

FIG. 2 illustrates an example computing device 200 in which aspects of access point association using trigger-based uplink single user (UL-SU) transmission can be implemented. The example computing device 200 is representative of a computing device implemented for communication in a Wi-Fi network system, such as the station device 106, or as the access point 102, as shown and described with reference to FIG. 1. The example device 200 may be implemented as any one or combination of a tablet computer, computing device, communication, entertainment, gaming, navigation, and/or other type of electronic or computing device. The computing device 200 can be implemented with various components, such as a processing system (e.g., the processor 202), memory 204, a power source (e.g., a battery for mobile devices) to power device components, and with any number and combination of different components as further described with reference to the example device shown in FIG. 5. The memory 204 can be implemented as any suitable memory device or electronic data storage in the computing device to store device and application data, as well as device applications, such as an operating system of the computing device.

As a communication-enabled device, the computing device 200 can include radio systems 206 implemented for data and voice communication. The different radio systems 206 may include, but are not limited to, a Wi-Fi system 208, Bluetooth™, Mobile Broadband, Long-Term Evolution (LTE), Near Field Communication (NFC), or any other wired or wireless communication system or format, configured for communication via respective LANs, WANs, and wireless networks. The Wi-Fi system 208 includes a receiver 210 and a transmitter 212, both of which may be implemented as integrated components of a transceiver 214.

Generally, the computing device 200 is implemented for IEEE 802.11 (Wi-Fi) compliance, such as for the new IEEE 802.11ax protocol for High Efficiency WLAN, with a media access control (MAC) and physical layer (PHY) interface for wireless communication. The MAC includes a management entity 216 that assigns the association identifier (AID) 218 for the association communications 220, such as between the access point 102 and the station device 106.

The management entity 216 can be implemented as a software application or module, such as computer-executable software instructions that are executable with the processor 202 (or with a processing system) to implement aspects of trigger-based UL-SU transmission as described herein. The management entity 216 can be stored on computer-readable storage memory (e.g., the device memory 204), such as any suitable memory device or electronic data storage implemented in the computing device. Although shown as a separate module or component in memory 204, the management entity 216 may be integrated as a module or component of the Wi-Fi system 208, or with any computer applications, such as an operating system of the computing device.

As noted above, the access point 102 as shown and described with reference to FIG. 1, may be implemented as the computing device 200 for wireless communication in a Wi-Fi network system. The receiver 210 (e.g., a receiver component of the transceiver 214 of the Wi-Fi system 208) can receive an association request 114 from a station device, such as the station device 106 shown and described with reference to FIG. 1. The management entity 216 can obtain an association identifier 218 for the station device 106 and generate the association response 116 as the acknowledgement 118 to the association request 114. The acknowledgement 118 includes the association identifier 218 and the unicast trigger frame 120 to initiate a trigger-based uplink single user (UL-SU) transmission from the station device 106. The transmitter 212 (e.g., a transmitter component of the transceiver 214 of the Wi-Fi system 208) can then communicate the acknowledgement 118 to the station device 106.

The access point 102 and the station device 106 are implemented for wireless communication in a High Efficiency WLAN (HEW), and the association request 114, an acknowledgement frame in UL-SU transmission, and the association response that includes the unicast trigger frame 120 are HEW compliant. The access point 102 and the station device 106 are also implemented to support a triggered uplink OFDMA (Orthogonal Frequency-Division Multiple Access) mode for multi-user transmission (including random access OFDMA). The unicast trigger frame 120 initiates the trigger-based UL-SU transmission as a single user transaction between the access point 102 and the station device 106 within the triggered uplink OFDMA mode.

The unicast trigger frame 120 with the association identifier 218 provides that the station device 106 can determine which resource unit contains the acknowledgement 118 from the access point 102 that is intended for the station device. The unicast trigger frame 120 also initiates the trigger-based UL-SU transmission as the single user transaction between the access point 102 and the station device 106. The trigger-based UL-SU transmission can be utilized for request/response-type management frame exchanges or subsequent data transmission from the station device 106 to the access point 102. The trigger-based UL-SU transmission also extends a communication range of the station device.

Generally, the Wi-Fi system 208 and the management entity 216 may be implemented and/or described in the general context of software, firmware, hardware (e.g., fixed logic circuitry), applications, modules, or any combination thereof. In some implementations, any of the components of the computing device 200, such as the processor 202, the memory 204, and the radio systems 206 may be implemented as a system-on-chip (SoC) in the computing device 200, such as described with reference to the example SoC shown in FIG. 3. Further, although the memory 204 is shown as a separate component in the computing device 200, the processor 202 (e.g., a microcontroller) can include the memory as a memory and processing system.

Figure 3:
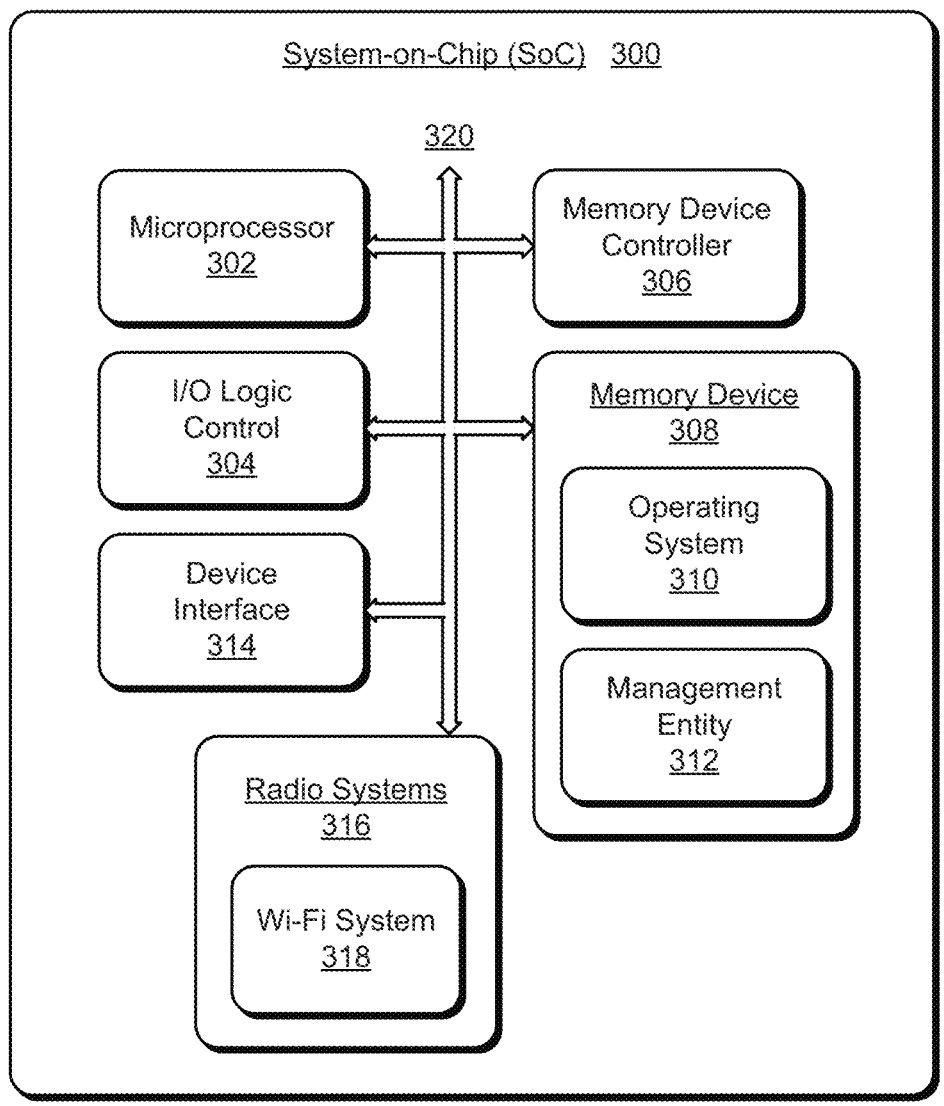
FIG. 3 illustrates an example system-on-chip (SoC) environment for aspects of access point association using trigger-based uplink single user transmission.

FIG. 3 illustrates an example system-on-chip (SoC) 300, which can implement various aspects of access point association using trigger-based uplink single user (UL-SU) transmission. The example SoC may be implemented in any type of computing device, such as the computing device 200 described with reference to FIG. 2 that can be any type of computer, a tablet device, mobile phone, multimedia device, printer, or other computing and/or electronic device. The SoC 300 can be integrated with electronic circuitry, a microprocessor, memory, input-output (I/O) logic control, communication interfaces and components, as well as other hardware, firmware, and/or software to implement the computing device 200.

In this example, the SoC 300 is integrated with a microprocessor 302 (e.g., any of a microcontroller or digital signal processor) and input-output (I/O) logic control 304 (e.g., to include electronic circuitry). The SoC 300 includes a memory device controller 306 and a memory device 308, such as any type of a nonvolatile memory and/or other suitable electronic data storage device. The SoC 300 can also include various firmware and/or software, such as an operating system 310 and a management entity 312 that are maintained by the memory device 308 and executed by the microprocessor. The SoC 300 can also include a dynamic memory, which along with the microprocessor 302, can be implemented as a microcontroller on the SoC.

The SoC 300 includes a device interface 314 to interface with a device or other peripheral component, such as when installed in the computing device 200 as described herein. In this example, the SoC 300 also includes one or more radio systems 316, such as the radio systems 206 that are shown and described with reference to the computing device 200 in FIG. 2, to include a Wi-Fi system 318. Alternatively, the radio systems 316 can be implemented as hardware, in firmware, as fixed logic circuitry, or as any combination thereof that is implemented in connection with the I/O logic control 304 and/or other processing and control circuits of the SoC 300. The SoC 300 also includes an integrated data bus 320 that couples the various components of the SoC for data communication between the components. The data bus in the SoC may also be implemented as any one or a combination of different bus structures and/or bus architectures.

Example method 400 is described with reference to FIG. 4 in accordance with one or more aspects of access point association using trigger-based uplink single user (UL-SU) transmission. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and some implementations can include software applications, programs, functions, and the like. Alternatively or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
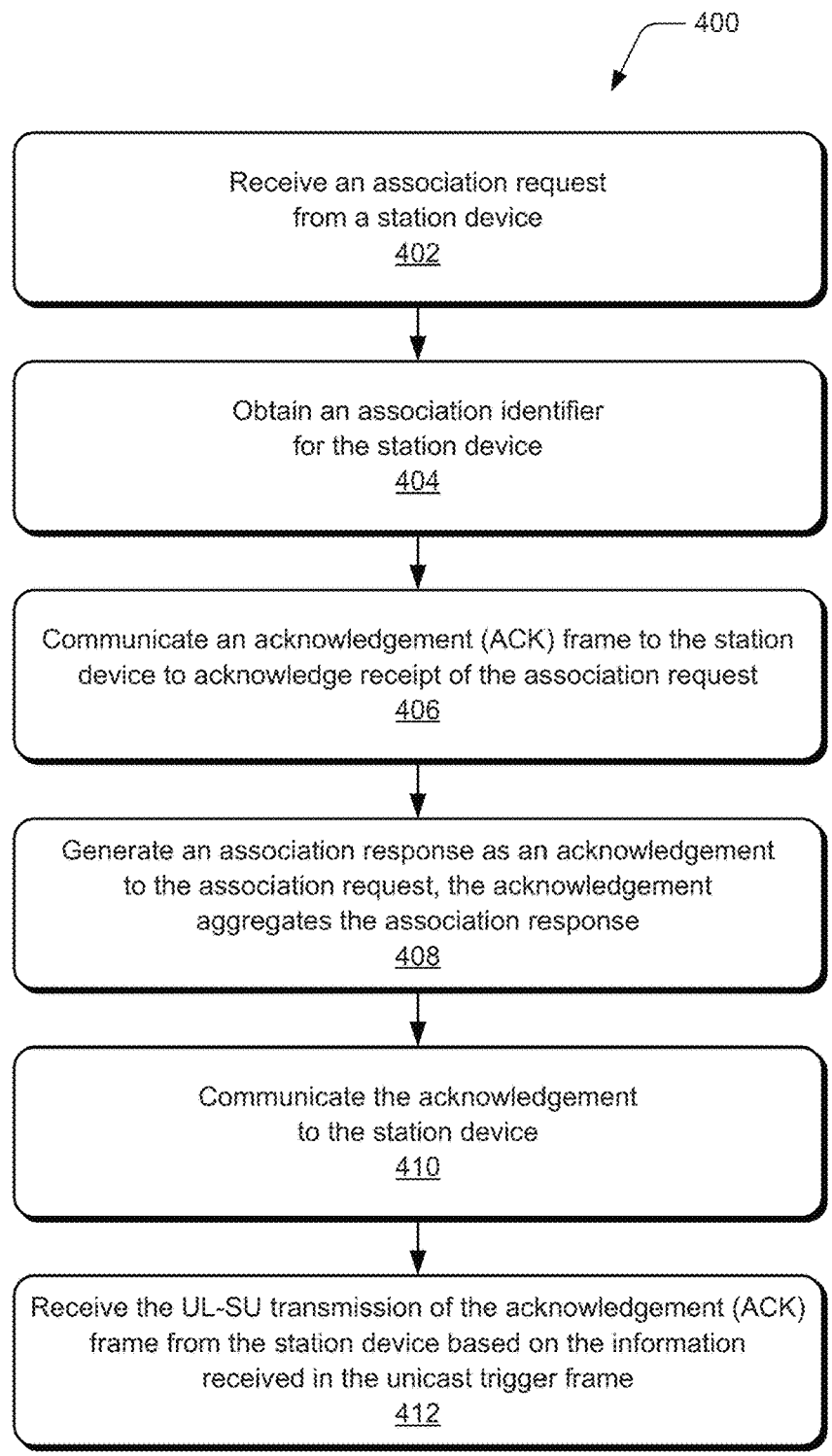
FIG. 4 illustrates an example method of access point association using trigger-based uplink single user transmission.

FIG. 4 illustrates example method(s) 400 of access point association using trigger-based uplink single user (UL-SU) transmission, and is generally described with reference to the example system shown and described with reference to FIG. 1. The order in which the method is described is not intended to be construed as a limitation, and any number of the described method operations can be combined in any order to implement the method, or an alternate method.

At 402, an association request is received from a station device. For example, the receiver 210 of the access point 102 receives the association request 114 from the station device 106 that detects the initial trigger frame 110 when in communication range 104 of the access point 102.

At 404, an association identifier for the station device is obtained. For example, the management entity 216 of the access point 102 obtains the association identifier (AID) 218 for the station device. The access point 102 is implemented for IEEE 802.11 (Wi-Fi) compliance, such as for the new IEEE 802.11ax protocol for High Efficiency WLAN (HEW), with a media access control (MAC) and physical layer (PHY) interface for wireless communication. The MAC includes the management entity 216 that assigns the association identifier (AID) 218 for the association communications 220 between the access point 102 and the station device 106.

At 406, communicate an acknowledgement (ACK) frame to the station device to acknowledge receipt of the association request. For example, the access point 102 communicates the acknowledgement (ACK) frame 122 to the station device 106 to acknowledge the successful receipt of the association request from the station device 106. The ACK frame 122 is a low mac-layer-level acknowledgement to the association request frame, whose MAC address will be the station device's MAC address.

At 408, an association response is generated as an acknowledgement to the association request, the acknowledgement aggregates the association response that includes the association identifier and a unicast trigger frame to initiate a trigger-based uplink single user (UL-SU) transmission from the station device. For example, the management entity 216 of the access point 102 generates the association response 116 as the acknowledgement 118 to the association request 114 from the station device 106. The acknowledgement 118 is generated to aggregate the association response that includes the association identifier 218 and the unicast trigger frame 120 to facilitate a trigger-based uplink single user (UL-SU) transmission from the station device.

At 408, the acknowledgement is communicated to the station device. For example, the transmitter 212 of the access point 102 communicates the acknowledgement 118 to the station device 106. The unicast trigger frame 120 with the association identifier 218 provides that the station device 106 can determine which resource unit contains the acknowledgement 118 from the access point 102 that is intended for the station device, and the unicast trigger frame 120 initiates the trigger-based UL-SU transmission as a single user transaction between the access point and the station device.

At 410, the uplink single user (UL-SU) transmission of the acknowledgement (ACK) frame is received from the station device based on the information received in the unicast trigger frame. For example, the access point 102 receives the uplink single user (UL-SU) transmission of the acknowledgement (ACK) frame from the station device based on the information received in the unicast trigger frame.

Figure 5:
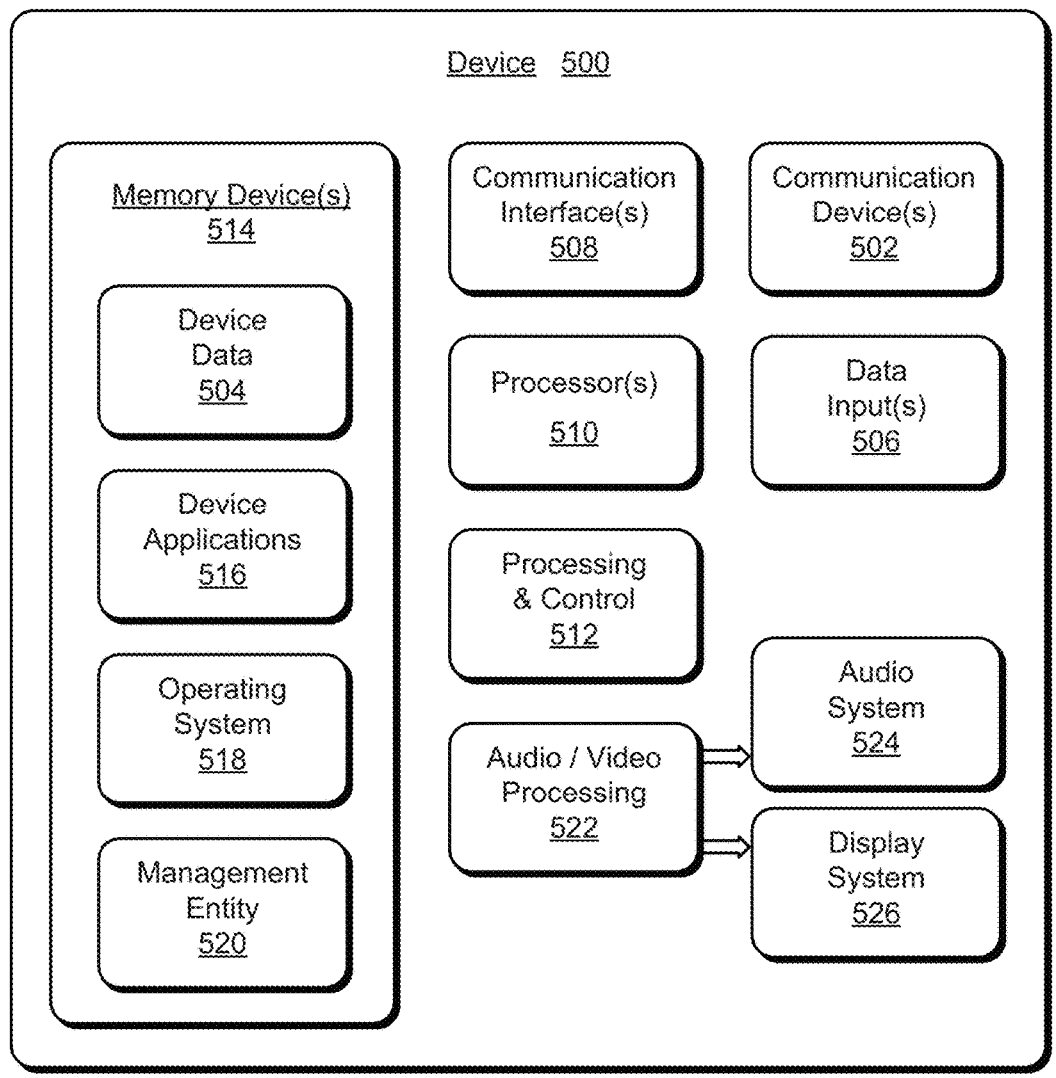
FIG. 5 illustrates various components of an example device that can implement aspects of access point association using trigger-based uplink single user transmission.

FIG. 5 illustrates various components of an example device 500 that can be implemented as any of the devices or systems described with reference to the previous FIGS. 1-4, such as any type of a computing device 200 as described with reference to FIG. 2. The device 500 may also be implemented to include the example system-on-chip (SoC) described with reference to FIG. 3. The device 500 may be associated with a user (i.e., a person) and/or an entity that operates the device such that a device describes logical devices that include software, firmware, hardware, and/or a combination of devices.

The device 500 includes communication devices 502 that enable wired and/or wireless communication of device data 504, such as received data, data that is communicated between devices, data packets of the data, etc. The device 500 also includes one or more data inputs 506 via which any type of data, media content, and/or inputs can be received, such as user-selectable inputs and any other type of audio, video, and/or image data received from any content and/or data source. The data inputs 506 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices.

The device 500 also includes communication interfaces 508, such as any one or more of a serial, parallel, network, or wireless interface. The communication interfaces provide a connection and/or communication links between the device and a network by which other electronic, computing, and communication devices communicate data with the device. Although not shown, the device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 includes one or more processors 510 (e.g., any of microprocessors, controllers, and the like), or a processor and memory system (e.g., implemented in an SoC), which processes computer-executable instructions to control the operation of the device. Alternatively or in addition, the device 500 can be implemented with any one or combination of software, hardware, firmware, or fixed logic circuitry that is implemented in connection with processing and control circuits which are generally identified at 512.

The device 500 also includes one or more memory devices 514 (e.g., computer-readable storage memory) that enables data storage, such as random access memory (RAM), nonvolatile memory (e.g., read-only memory (ROM), flash memory, etc.), and a disk storage device. The memory devices 514 can be accessed by a computing device, and provide persistent storage of data and executable instructions (e.g., software applications, modules, programs, functions, and the like). A disk storage device may be implemented as any type of magnetic or optical storage device, such as a hard disk drive, a recordable and/or rewriteable disc, and the like. The device may also include a mass storage media device. Computer-readable storage memory can be any suitable electronic data storage in various memory device configurations that are accessed by a computing device.

A memory device 514 provides data storage to store the device data 504, other types of information and/or data, and device applications 516. For example, an operating system 518 can be maintained as a software application with the memory device and executed by a processor 510. The device applications may also include a device manager or controller, such as any form of a control application, software application, signal processing and control module, code that is native to a particular device, a hardware abstraction layer for a particular device, and so on. In this example, the device 500 also includes a management entity 520 of a Wi-Fi system, such as when the device 500 is implemented as the access point 102 or as the station device 106, as shown and described with reference to the previous FIGS. 1-4.

The device 500 may also include an audio and/or video processing system 522 that generates audio data for an audio system 524 and/or generates display data for a display system 526. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Further aspects of the present invention relate to one or more of the following clauses. An access point implemented for wireless communication comprises a receiver component configured to receive an association request from a station device; a management entity configured to obtain an association identifier for the station device and generate an association response as an acknowledgement to the association request, the acknowledgement aggregates an association response frame that includes the association identifier and a unicast trigger frame to initiate a trigger-based uplink single user (UL-SU) transmission from the station device; and a transmitter component configured to communicate the acknowledgement to the station device.

The unicast trigger frame with the association identifier provides that the station device can determine the resource unit with which the station device can transmit back to the access point the ACK frame for the association response. The unicast trigger frame initiates the trigger-based UL-SU transmission as a single user transaction between the access point and the station device. The trigger-based UL-SU transmission is configured for request/response-type management frame exchanges or subsequent data transmission from the station device to the access point. The trigger-based UL-SU transmission extends a communication range of the station device. The access point and the station device are implemented to support a triggered uplink OFDMA (Orthogonal Frequency-Division Multiple Access) mode for multi-user transmission, the uplink OFDMA mode including random access OFDMA; and the unicast trigger frame initiates the trigger-based UL-SU transmission as a single user transaction between the access point and the station device within the triggered uplink OFDMA mode. The access point and the station device are implemented to support triggered uplink OFDMA; the access point and the station device are configured for wireless communication in a High Efficiency WLAN (Wireless Local Area Network) (HEW); and the association request, an acknowledgement frame in UL-SU transmission, and the association response that includes the unicast trigger frame are HEW compliant.

A method is implemented by an access point in a wireless communication network, the method comprising receiving an association request from a station device; obtaining an association identifier for the station device; generating an association response as an acknowledgement to the association request, the acknowledgement aggregates the association response that includes the association identifier and a unicast trigger frame to initiate a trigger-based uplink single user (UL-SU) transmission from the station device; and communicating the acknowledgement to the station device.

The unicast trigger frame with the association identifier provides that the station device can determine which resource unit contains the acknowledgement from the access point that is intended for the station device. The unicast trigger frame initiates the trigger-based UL-SU transmission as a single user transaction between the access point and the station device. The trigger-based UL-SU transmission is configured for request/response-type management frame exchanges or subsequent data transmission from the station device to the access point. The trigger-based UL-SU transmission extends a communication range of the station device. The access point and the station device are implemented to support a triggered uplink OFDMA (Orthogonal Frequency-Division Multiple Access) mode for multi-user transmission, the uplink OFDMA mode including random access OFDMA; and the unicast trigger frame initiates the trigger-based UL-SU transmission as a single user transaction between the access point and the station device within the triggered uplink OFDMA mode. The access point and the station device are implemented to support triggered uplink OFDMA; the access point and the station device are configured for wireless communication in a High Efficiency WLAN (Wireless Local Area Network) (HEW); and the association request, the acknowledgement in UL-SU transmission, and the association response frame that is aggregated with the unicast trigger frame are HEW compliant.

A wireless network system comprises a station device configured to: detect an initial trigger frame that is communicated in the wireless network system; and communicate an association request through random access uplink OFDMA (Orthogonal Frequency-Division Multiple Access) to join the wireless network system. The wireless network system also comprises an access point configured to: receive the association request from the station device; generate an association response as an acknowledgement to the association request, the acknowledgement aggregates an association response frame that includes an association identifier for the station device and a unicast trigger frame to initiate a trigger-based uplink single user (UL-SU) transmission from the station device; and communicate the acknowledgement to the station device.

The station device is configured to receive the acknowledgement from the station device; and determine which resource unit contains the acknowledgement from the access point that is intended for the station device based on the unicast trigger frame included in the acknowledgement. The access point and the station device use the triggered UL-SU transmission for request/response-type management frame exchange or subsequent data transmission. The trigger-based UL-SU transmission extends a communication range of the station device. The access point and the station device are implemented to support a triggered uplink OFDMA (Orthogonal Frequency-Division Multiple Access) mode for multi-user transmission, the uplink OFDMA mode including random access OFDMA; and the unicast trigger frame initiates the trigger-based UL-SU transmission as a single user transaction between the access point and the station device within the triggered uplink OFDMA mode. The access point and the station device are implemented to support triggered uplink OFDMA; the access point and the station device are configured for wireless communication in a High Efficiency WLAN (Wireless Local Area Network) (HEW); and the association request, the acknowledgement in UL-SU transmission, and the association response that includes the unicast trigger frame are HEW compliant.

Although aspects of access point association using trigger-based uplink single user transmission have been described in language specific to features and/or methods, the appended claims are not necessarily limited to the specific features or methods described. Rather the specific features and methods are disclosed as example implementations of access point association using trigger-based uplink single user transmission, and other equivalent features and methods are intended to be within the scope of the appended claims. Further, various different aspects are described and it is to be appreciated that each described aspect can be implemented independently or in connection with one or more other described aspects.

What is claimed is:

1. An access point implemented for wireless communication, comprising:
   a receiver component configured to receive an association request from a station device;
   a management entity configured to obtain an association identifier for the station device and generate an association response as an acknowledgement to the association request, the acknowledgement aggregates an association response frame that includes the association identifier and a unicast trigger frame to initiate a trigger-based uplink single user (UL-SU) transmission from the station device; and
   a transmitter component configured to communicate the acknowledgement to the station device.

2. The access point as recited in claim 1, wherein the unicast trigger frame with the association identifier provides that the station device can determine which resource unit contains the acknowledgement from the access point that is intended for the station device.

3. The access point as recited in claim 1, wherein the unicast trigger frame initiates the trigger-based UL-SU transmission as a single user transaction between the access point and the station device.

4. The access point as recited in claim 1, wherein the trigger-based UL-SU transmission is configured for request/response-type management frame exchanges or subsequent data transmission from the station device to the access point.

5. The access point as recited in claim 1, wherein the trigger-based UL-SU transmission extends a communication range of the station device.

6. The access point as recited in claim 1, wherein:
   the access point and the station device are implemented to support a triggered uplink OFDMA (Orthogonal Frequency-Division Multiple Access) mode for multi-user transmission, the uplink OFDMA mode including random access OFDMA; and
   the unicast trigger frame initiates the trigger-based UL-SU transmission as a single user transaction between the access point and the station device within the triggered uplink OFDMA mode.

7. The access point as recited in claim 1, wherein:
   the access point and the station device are implemented to support triggered uplink OFDMA (Orthogonal Frequency-Division Multiple Access);
   the access point and the station device are configured for wireless communication in a High Efficiency WLAN (Wireless Local Area Network) (HEW); and
   the association request, an acknowledgement frame in UL-SU transmission, and the association response that includes the unicast trigger frame are HEW compliant.

8. A method implemented by an access point in a wireless communication network, the method comprising:
   receiving an association request from a station device;
   obtaining an association identifier for the station device;
   generating an association response as an acknowledgement to the association request, the acknowledgement aggregates an association response frame that includes the association identifier and a unicast trigger frame to initiate a trigger-based uplink single user (UL-SU) transmission from the station device; and
   communicating the acknowledgement to the station device.

9. The method as recited in claim 8, wherein the unicast trigger frame with the association identifier provides that the station device can determine which resource unit carries the acknowledgement from the access point that is intended for the station device.

10. The method as recited in claim 8, wherein the unicast trigger frame initiates the trigger-based UL-SU transmission as a single user transaction between the access point and the station device.

11. The method as recited in claim 8, wherein the trigger-based UL-SU transmission is configured for request/response-type management frame exchanges or subsequent data transmission from the station device to the access point.

12. The method as recited in claim 8, wherein the trigger-based UL-SU transmission extends a communication range of the station device.

13. The method as recited in claim 8, wherein:
   the access point and the station device are implemented to support a triggered uplink OFDMA (Orthogonal Frequency-Division Multiple Access) mode for multi-user transmission, the uplink OFDMA mode including random access OFDMA; and
   the unicast trigger frame initiates the trigger-based UL-SU transmission as a single user transaction between the access point and the station device within the triggered uplink OFDMA mode.

14. The method as recited in claim 8, wherein:
   the access point and the station device are implemented to support triggered uplink OFDMA (Orthogonal Frequency-Division Multiple Access);
   the access point and the station device are configured for wireless communication in a High Efficiency WLAN (Wireless Local Area Network) (HEW); and
   the association request, the acknowledgement in UL-SU transmission, and the association response that includes the unicast trigger frame are HEW compliant.

15. A wireless network system, comprising:
   a station device configured to:
      detect an initial trigger frame that is communicated in the wireless network system;
      communicate an association request through random access uplink OFDMA (Orthogonal Frequency-Division Multiple Access) to join the wireless network system;
   an access point configured to:
      receive the association request from the station device;
      generate an association response as an acknowledgement to the association request, the acknowledgement aggregates an association response frame that includes an association identifier for the station device and a unicast trigger frame to initiate a trigger-based uplink single user (UL-SU) transmission from the station device; and
      communicate the acknowledgement to the station device.

16. The wireless network system as recited in claim 15, wherein the station device is configured to:
   receive the acknowledgement from the station device; and
   determine which resource unit that contains the acknowledgement from the access point that is intended for the station device based on the unicast trigger frame with the association identifier included in the acknowledgement.

17. The wireless network system as recited in claim 15, wherein the access point and the station device use the triggered UL-SU transmission for request/response-type management frame exchange or subsequent data transmission.

18. The wireless network system as recited in claim 15, wherein the trigger-based UL-SU transmission extends a communication range of the station device.

19. The wireless network system as recited in claim 15, wherein:
- the access point and the station device are implemented to support a triggered uplink OFDMA (Orthogonal Frequency-Division Multiple Access) mode for multi-user transmission, the uplink OFDMA mode including random access OFDMA; and
- the unicast trigger frame initiates the trigger-based UL-SU transmission as a single user transaction between the access point and the station device within the triggered uplink OFDMA mode.

20. The wireless network system as recited in claim 15, wherein:
- the access point and the station device are implemented to support triggered uplink OFDMA (Orthogonal Frequency-Division Multiple Access);
- the access point and the station device are configured for wireless communication in a High Efficiency WLAN (Wireless Local Area Network) (HEW); and
- the association request, the acknowledgement in UL-SU transmission, and the association response that includes the unicast trigger frame are HEW compliant.

* * * * *